Patented May 27, 1947

UNITED STATES PATENT OFFICE 2,421,315

CHROMIUM COMPLEX OF MONAZO PYRAZOLONE

Boyce Galloway Carson, Woodstown, N. J., assignor to E. I. du Pont de Nemours & Company, Wilmington, Del., a corporation of Delaware No Drawing. Application June 9, 1943, Serial No. 490,193

4 Claims. (Cl. 260—147)

This invention relates to the dyeing of wool and to the preparation of new dyestuffs which have superior properties when applied on wool.

The prior art contains a disclosure of a series of metallizable azo dyestuffs which could be applied by the after-chrome or after-copper process to wool. Berichte 39, 80 (1922) and German Patent 139,327 (1901). Those dyestuffs are made by coupling the diazo oxide of 3,6-dichloro-2-amino-phenol-4-sulfonic acid to a variety of coupling components, but none of them has been of lasting commercial interest, presumably because of certain imperfections such as deficient levelling and inferior fastness. In British Patent 541,692 there is disclosed the chromium complex of the dye prepared from the diazo oxide of 3,6'-dichloro-2-amino-phenol-4-sulfonic acid and 5,8-dichloro-1-naphthol. That dye is also deficient in levelling and fastness.

It is an object of this invention to prepare a class of dyestuffs for application to wool which is characterized by excellent levelling and fastness properties. It is also an object of the invention to prepare particular dyestuffs which are most superior in these respects.

The objects of the invention are accomplished, generally speaking, by coupling the diazo oxide of 3,6-dichloro-2-amino-phenol-4-sulfonic acid to azo coupling components containing at least one sulfonic acid group or sulfonamide group. The sulfonamide group may be N-substituted. The new colors are represented by the formula

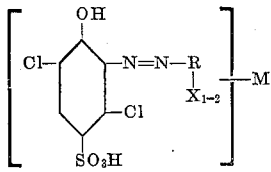

in which R is the radical of an azo dyestuff coupling component of the benzene, naphthalene, acetoacet-arylide, pyrazolone and quinoline series, each of which must contain hydroxy or amino ortho to the azo bridge; M is a metal from the group chromium, cobalt, copper, nickel, manganese, iron and vanadium; and X is sulfonic acid or sulfonamide. A preferred class of these colors is made from the pyrazolones, among which are found very yellow shades of orange which are distinctive.

Examples of the sulfonated benzenes which may be used as the coupling components are 4-amino-2-hydroxy-benzene-sulfonic acid; 2,4-dihydroxy-benzene-sulfonic acid; 4-hydroxy-2-amino-benzene-sulfonic acid; and 5-methyl-2-hydroxy-benzene sulfonic acid. The last of these is very weak as a coupling component but, to the extent that it will couple, may be converted to a useful metallic complex. These members are merely illustrative of the utility of the class.

The class of sulfonated acetoacet-arylides is very small. Those which exist are useful as coupling components.

A further comprehension of the extent of the invention will be found by consideration of the following examples in which the quantities are by weight unless otherwise indicated.

EXAMPLE I 27.65 parts of 2,4,5-trichloro-metanilic acid is slurried in 275 parts of water, while the temperature of the water is raised till all the solid material is dissolved. The solution is cooled to 25–30° C. by the addition of 100 parts of ice and 6.9 parts of sodium nitrite is added as a 30% solution. To this solution is added as rapidly as possible 7.3 parts of hydrochloric acid. Diazotization is almost instantaneous, and the diazotized trichloro-metanilic acid is precipitated almost completely. This diazo is transformed to the diazo oxide. To the slurry of precipitated diazo compound is added 68 parts of crystalline sodium acetate, and the mixture is stirred till the solid diazo compound goes into solution and the red solution will no longer couple with an alkaline G-salt solution. The diazo oxide solution thus formed is coupled in alkaline medium by adding the solution slowly to a solution containing 26.7 parts of 1-(3'-sulfo-phenyl)-3-methyl-5-pyrazolone, 21.2 parts of soda ash, 50.0 parts of ice, and 100 parts of water iced to 5–10° C. The coupling is rapid. When the coupling is complete, the dye solution is heated to 75° C. and the product of coupling is precipitated by adding 70 parts of common salt, 7.3 parts of hydrochloric acid. After cooling the solution to 50° C. the product of coupling, which is represented by the formula:

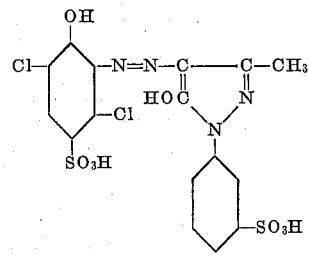

is filtered off. This compound is converted to its chromium complex by adding the wet press cake to a suspension of 20 parts of hydrated chromium fluoride in 100 parts of water and refluxing the whole for about twenty hours. When the formation of the chromium complex is complete, the solution is cooled to room temperature, and the dye is precipitated by the addition of 15 parts of common salt.

The dye is a yellowish-brown powder dyeing wool from a dyebath containing sulfuric acid in a very even yellow shade of orange. The fastness to light, fulling, and washing properties of the dyeing are comparable to that of the very red oranges of the prechromed type heretofore available to the dyers.

Dyes of essentially the same shade and dyeing and fastness properties are obtained by substituting for the 1-(3'-sulfo-phenyl)-3-methyl-5-pyrazolone other pyrazolones such as 1-(4'-chloro - 3' - sulfo - phenyl) - 3 - methyl - 5 - pyrazolone, 1 - (4' - methyl -2'- sulfo-phenyl)-3-methyl - 5 - pyrazolone, 1-(2'-sulfo - phenyl) -3-methyl-5-pyrazolone, or 1-(4'-methyl-3'-sulfo-phenyl)-3-methyl-5-pyrazolone.

Excellent dyestuffs are also produced by the use of phenyl-pyrazolone carboxylic acids such as 1 - (3'-sulfo-phenyl) -5-pyrazolone-3-carboxylic acid, 1-(2'-sulfo-phenyl)-5-pyrazolone-3-carboxylic acid, 1-(4'-sulfo-phenyl)-5-pyrazolone-3-carboxylic acid, 1-(4'-methyl-2'-sulfo-phenyl)-5-pyrazolone-3-carboxylic acid, and 1-(2' - methyl - 4' - sulfo-phenyl)-5-pyrazolone-3-carboxylic acid.

Instead of chromium fluoride, other trivalent chromium salts such as the acetate, the sulfate, or the formate may be employed with similar results.

EXAMPLE II 27.65 parts of 2,4,5-trichloro-metanilic acid are diazotized and converted to the diazo oxide of 3,6-dichloro-2-amino-phenol-4-sulfonic acid as in Example I. The solution of the diazo oxide is added slowly with good agitation to a cold solution of 31.9 parts of 2-naphthol-3,6-disulfonic acid, 26.5 parts of calcined sodium carbonate and 300 parts of water. When the coupling is complete, the dye is separated by the addition of enough hydrochloric acid to make the solution strongly acid to Congo red paper and adding at 90-95° C. 80 parts of common salt. The dye in the form of its free acid has the structure:

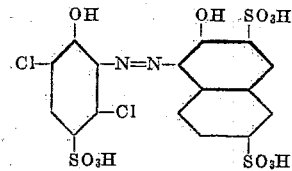

The free acid dye from this coupling is added to a suspension of chromium fluoride equivalent to 8.4 parts of chromium oxide in 100 parts of water. The mixture is refluxed till the formation of the chromium complex is complete, after which the solution is evaporated to dryness. The dye is a blue-red powder dyeing wool from a bath containing sulfuric acid an even shade of red violet. The dyeings have good fastness to light, fulling, and washing. The transfer properties of the dyes are especially good.

EXAMPLE III 27.65 parts of 2,4,5-trichloro-metanilic acid is converted to the diazo oxide of 3,6-dichloro-4-sulfo-2-amino-phenol as described in Example I. The solution thus formed is allowed to run slowly into a cold alkaline solution containing 33.5 parts of K-salt (1,8-amino-naphthol-4,6-disulfonic acid), 26.4 parts of sodium carbonate and 200 parts of water. The temperature of the mixture is maintained at 5-10° C. till coupling is complete, after which time the dye is separated by the addition of 100 parts of common salt, heating the solution to 70° C., and adding hydrochloric acid to strong Congo red acidity. The separated dye has in the form of its free acid the structure

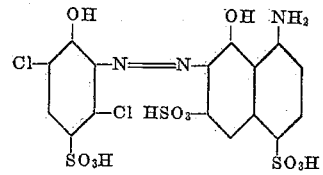

The wet press cake of the above coupling is added to a suspension of chromium fluoride, equivalent to 8.4 parts of chromium oxide, in 100 parts of water. The whole is refluxed for several hours, after which the chromium complex of the dye is separated by the addition of common salt. The dye, when applied to wool from a bath containing sulfuric acid and Glauber's salt, dyes wool a very even shade of reddish blue. The dyeings are fast-to-light, washing and fulling.

The use of amino-naphthalene-sulfonic acids as coupling components is illustrated by the following: 2-amino-naphthalene-6-sulfonic acid, 2-amino-naphthalene-7-sulfonic acid, 2-amino-naphthalene-5,7-disulfonic acid, 2-amino-naphthalene-6,8-disulfonic acid, 2-amino-3-carboxy-naphthalene-6-sulfonic acid, and 2-amino-naphthalene-8-sulfonic acid.

Other metalliferous dyes from 3,6-dichloro-2-amino-phenol-4-sulfonic acid, prepared in essentially the same way as the dyes of Examples I, II, and III, are tabulated below.

Table I

| Ex. | Coupling Component | Metal in Complex | Shade on Wool |
| --- | --- | --- | --- |
| 4 | 1,8-amino-naphthol-4-sulfonic acid (alkaline coupling) | Chromium | Green Blue. |
| 5 | 1-naphthol-5-sulfonic acid | do | Blue Violet. |
| 6 | 2-naphthol-7-sulfonic acid | do | Blue Red. |
| 7 | 1,8-amino-naphthol-3,6-disulfonic acid | do | Blue. |
| 8 | 1-(3'-omega-sulfo-methyl)-3-methyl-5-pyrazolone | do | Yellow Orange. |
| 9 | 2-acetyl-amino-5-naphthol-7-sulfonic acid | do | Red Violet. |
| 10 | Acetoacetanilide-p-sulfonic acid | do | Yellow. |
| 11 | 2-amino-naphthalene-5-sulfonic acid | do | Bordeaux. |
| 12 | 1,8-amino-naphthol-4-sulfonic acid (acid coupling) | do | Gray. |
| 13 | 1,8-amino-naphthol-2-sulfonic acid | do | Blue. |
| 14 | 1,8-amino-naphthol-2,4-disulfonic acid | do | Do. |
| 15 | 1,8-dihydroxy-naphthalene, 3,6-disulfonic acid | do | Blue Violet. |
| 16 | 2-naphthol-6-sulfonic acid | do | Red Violet. |
| 17 | 8-hydroxy-quinoline-5-sulfonic acid | do | Blue Bordeaux. |
| 18 | 1-(2',5'-dichloro-4'-sulfo-phenyl)-3-methyl-5-pyrazolone | do | Yellow Orange. |
| 19 | 1-(4'-sulfo-phenyl)-3-methyl-5-pyrazolone | do | Do. |
| 20 | 1-(4'-sulfo-phenyl)-5-pyrazolone-3-carboxylic acid | do | Orange. |
| 21 | 1-(4'-omega-sulfo-methyl-phenyl)-3-methyl-5-pyrazolone | do | Yellow Orange. |
| 22 | 1,3-diamino-benzene-4-sulfonic acid | do | Brown. |
| 23 | 1-(phenyl)-3-methyl-5-pyrazolone-3'-sulfonamide | do | Yellow Orange. |
| 24 | 1-(phenyl)-3-methyl-5-pyrazolone-3'-methyl-sulfonamide | do | Do. |
| 25 | 2-naphthol-6-sulfonamide | do | Red Violet. |
| 26 | 1-(phenyl)-3-methyl-5-pyrazolone-4'-sulfonamide | do | Yellow Orange. |

It is understood that the diazo oxide of 3,6-dichloro-2-amino-phenol-4-sulfonic acid may be obtained directly from the dichloro-amino-phenol sulfonic acid instead of from 2,4,5-trichloro-metanilic acid, but the preferred method of obtaining this diazo oxide is the method used in the examples cited. The pH value of the coupling media may be varied through a wide range from strong caustic alkalinity to buffered acetic acid acidity. The formation of the metallic complexes may be carried out using any of the agents ordinarily employed to yield metals forming complexes with o,o'-dihydroxy-azo compounds. The metallization may be carried out with or without the addition of agents which promote metallization such as alcohols, amines, cyclic nitrogen compounds, poly-hydroxy-compounds, and the like. However, the coupling components must contain at least one sulfonic acid or sulfonamide group.

Formerly the chromiferous yellow oranges used in the dyeing of wool have been deficient in levelling properties and light fastness. The red oranges have been much superior. The present invention enables the dyer to use a yellow orange chromiferous dye with equal success. Dyeings on wool of the yellow oranges of this invention possess light fastness at least twice that of the yellow oranges of comparable dyeing properties known to the prior art. It is also possible to prepare greener blues without sacrificing light fastness, which is an advantage over the prior art whose blues deteriorated in light fastness as they shaded toward green. Other advantages of the invention will be apparent from the specification and claims.

As many apparently widely different embodiments of this invention may be made without departing from the spirit and scope thereof, it is to be understood that I do not limit myself to the specific embodiments thereof except as defined in the appended claims.

I claim:

1. The chromium complex of a dye represented by the formula

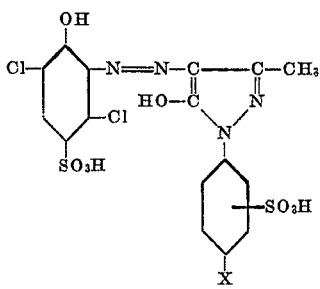

in which X is one of the group consisting of hydrogen, chloro and methyl.

2. The chromium complex of the dyestuff represented by the formula:

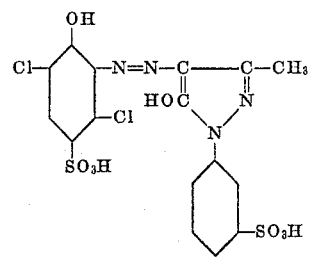

3. The chromium complex of the dyestuff represented by the formula:

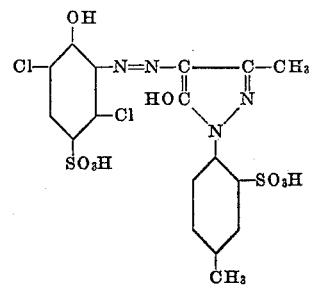

4. The chromium complex of the dyestuff represented by the formula:

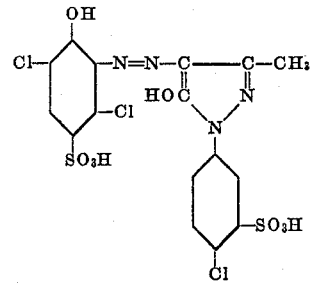

BOYCE GALLOWAY CARSON.

REFERENCES CITED

The following references are of record in the file of this patent:

UNITED STATES PATENTS

| Number | Name | Date |
|---|---|---|
| 2,289,210 | Reynolds | July 7, 1942 |
| 1,949,228 | Winkeler et al. | Feb. 27, 1934 |
| 2,040,368 | Fischer | May 12, 1936 |
| 1,918,002 | Straub et al. | July 11, 1933 |
| 1,809,030 | Geller | June 9, 1931 |

FOREIGN PATENTS

| Number | Country | Date |
|---|---|---|
| 541,692 | Great Britain | Dec. 8, 1941 |
| 20,551 | Great Britain | 1901 |
| 14,316 | Great Britain | 1909 |